United States Patent [19]

Veale

[11] Patent Number: 4,491,776
[45] Date of Patent: Jan. 1, 1985

[54] SERVO OPERATED DIGITAL POSITIONING CONTROL SYSTEM

[75] Inventor: John R. Veale, Manhattan Beach, Calif.

[73] Assignee: Manhattan Engineering Company, Inc., Manhattan Beach, Calif.

[21] Appl. No.: 381,975

[22] Filed: May 25, 1982

[51] Int. Cl.³ .............................................. G05B 13/00
[52] U.S. Cl. ................................. 318/561; 318/615; 318/617; 318/618
[58] Field of Search ............... 318/561, 615, 616, 617, 318/618

[56] References Cited

U.S. PATENT DOCUMENTS

| | | | |
|---|---|---|---|
| 3,739,158 | 6/1973 | Woodward | 318/615 X |
| 4,031,443 | 6/1977 | Droux | 318/617 X |
| 4,168,457 | 9/1979 | Rose | 318/632 |
| 4,263,627 | 4/1981 | Rose | 318/632 X |
| 4,268,783 | 5/1981 | Murray | 318/632 X |
| 4,311,945 | 1/1982 | Aoyama | 318/615 |
| 4,355,272 | 10/1982 | Wise | 318/632 X |
| 4,366,422 | 12/1982 | Rhodes | 318/632 |

*Primary Examiner*—B. Dobeck
*Attorney, Agent, or Firm*—Robert J. Schaap

[57] ABSTRACT

A closed loop servo operated digital control system in which a dynamically operable moveable member can be effectively and accurately controlled during movement from an initial position to a command position by compensating for both velocity error and for position error. A differential between a present measured position of the moveable member and a command position provides a position error signal. Present velocity is determined by computing position differential as a function of time. A velocity error signal is obtained by subtracting the determined velocity from a velocity command which is stored as a velocity command profile. The total error is the resultant sum of the position error and a velocity error and this sum is converted to an analog signal in order to power an amplifier/motor which, in turn, provides power for the control system.

30 Claims, 7 Drawing Figures

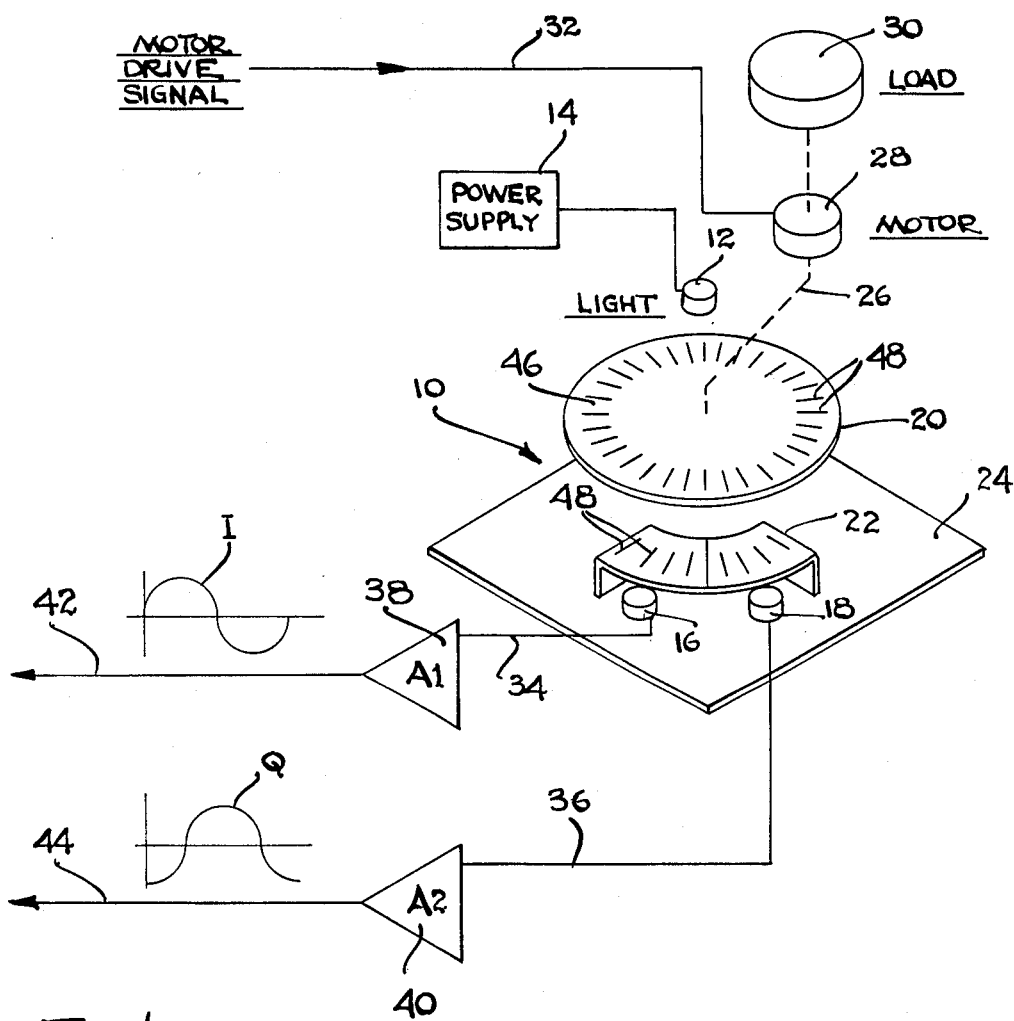
Fig. 1
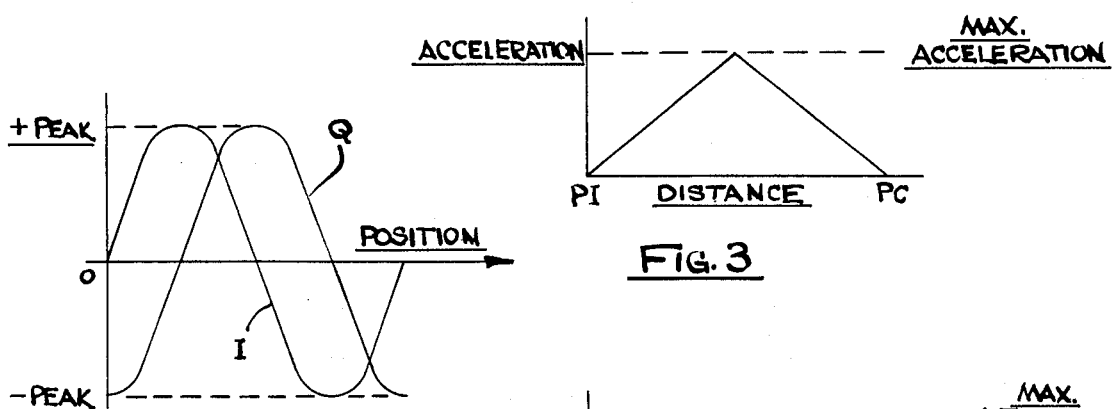
Fig. 2
Fig. 3
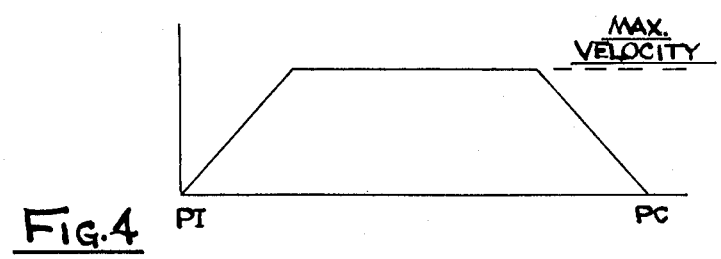
Fig. 4

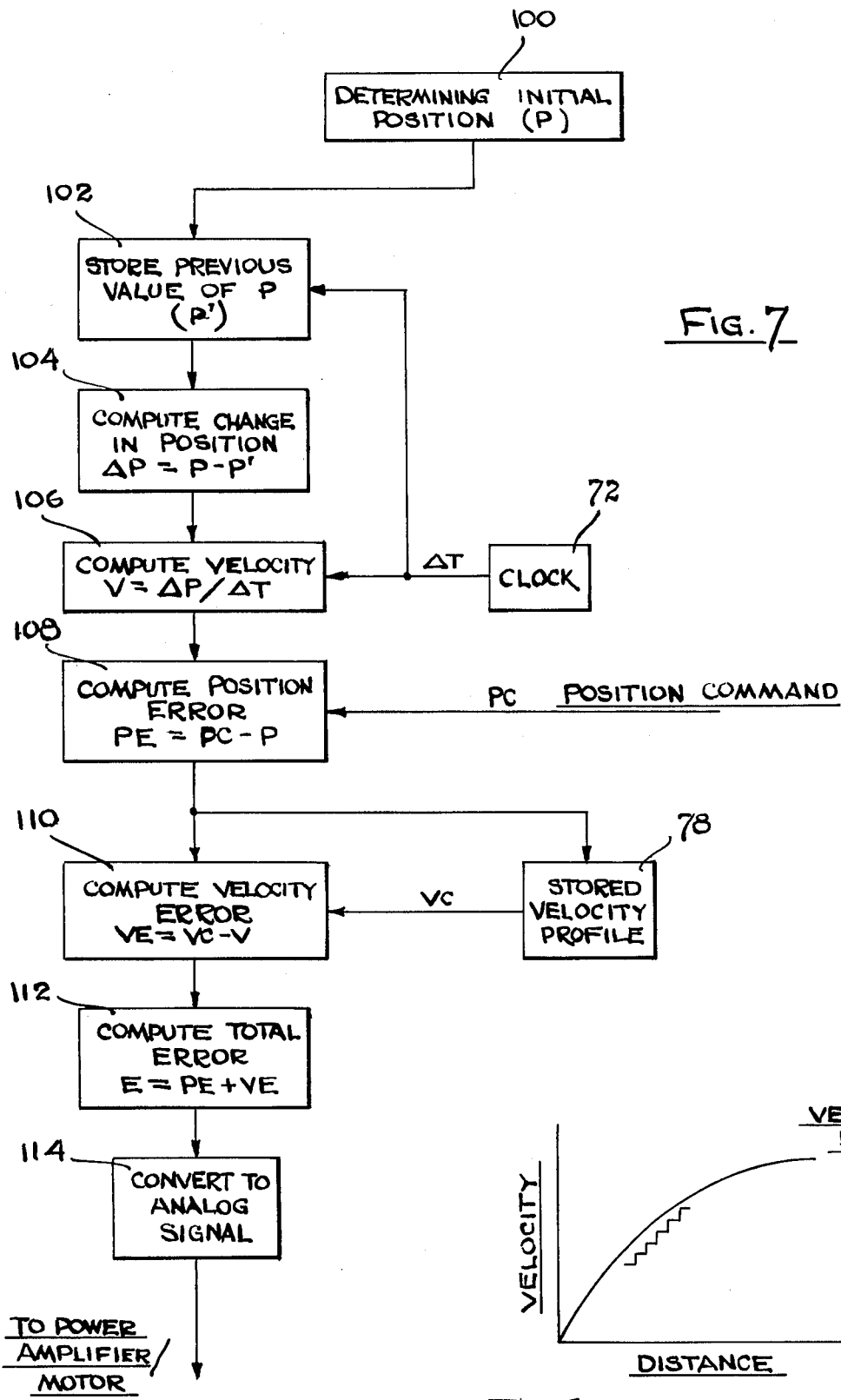

SERVO OPERATED DIGITAL POSITIONING CONTROL SYSTEM

BACKGROUND OF THE INVENTION

1. Field of the Invention

This invention relates to servo operated digital positioning control systems, and more particularly, to digital positioning control systems of the type stated which is capable of accurately positioning a dynamically moveable member in response to a position command signal on a highly efficient basis, and which can be used inexpensively in industrial and commercial applications.

2. Brief Description of the Prior Art

High accuracy positioning systems have been used for many years in a variety of military and aerospace applications to position moveable control members. Such applications include the positioning of antennas and optical sensors. A key element in any positioning system is the position transducer used to determine the position of the moveable control element since the overall performance of the positioning system is a function of the accuracy, repeatability and linearity of the position transducer. Historically, many types of transducers have been employed to measure position such as potentiometers, resolvers, differential transformers, magnetic encoders, optical encoders and the like.

Optical shaft encoders have found widespread use as position transducers in high accuracy positioning systems. In particular, absolute position optical encoders are employed to obtain the high resolution necessary for accurate positioning. These types of encoders include a light source such as a light emitting diode, a group of photo-sensors such as photo-diodes, and a coded disk positioned between the light source and the photo-sensors. If the control element to be positioned is the shaft of a motor, the coded disk is rotatably mounted to the motor shaft. The coded disk includes patterns of clear and opaque segments which vary in size and location according to the resolution required by the application. The patterns are arranged so that light passes from the light source through the clear segments of the disk and illuminates the photo-sensors in a prescribed manner whereby the photo sensor output signals form a binary representation of the absolute position of the motor shaft.

Further, in any positioning system and, particularly servo control positioning systems, a high quality motor, such as a servo type motor, is used for operation. It is desirable to position the moveable member to the command position as quickly as possible without overshoot, or undershoot, or other type of positioning error. For example, in the case of a servo system for moving a reading head in a computer, it is desirable to position the reading head at the proper track and sector, upon receiving the address or command position, in the most efficient and fastest manner available within the constraints of the system itself.

In many prior art servo systems, there are repeatable error components. For the most part, it is possible to compensate for these repeatable error components. However, it is difficult to compensate for the non-repeatable error components which may exist in the servo motor itself and elsewhere. After a period of time, it has been found that many other errors creep into most digital servo control systems and which do affect velocity and position factors.

In most positioning systems, the movement of the moveable member is constrained by acceleration factors, maximum possible velocity and the like. Thus, if a moveable member were to be moved from an initial starting position to a command position, it would be desirable to accelerate to a mid point between these two positions and thereafter decelerate to the command position. In most cases, this is not accurately achievable. In addition, it would be desirable to increase the velocity from the initial starting position to a maximum velocity and move at the member at that maximum velocity to a point in advance of the command position where deceleration starts with a velocity profile decrease so that the moveable member stops exactly at the command position. Here again, this is not effectively accurately obtained in most prior art systems. Failure to obtain optimum acceleration and velocity profiles is due in part to the fact that acceleration and velocity control is limited by the servo motor or other form of drive motor and various mechanical components in the system.

There have been many elaborate prior art controls which have been utilized in digital servo systems and which utilize some form of profile for obtaining proper positioning of a moveable member. For example, U.S. Pat. No. 3,881,184 to Koepcke et al discloses the use of an adaptive digital servo system having a track position profile mechanism for generating a sequence of binary position signals having a correction signal for each position signal in the position profile.

U.S. Pat. No. 3,994,016 to Moghadam also discloses a closed loop and head positioning servo system in which a track counting course positioning system is used along with a fine positioning system. U.S. Pat. No. 4,268,785 to Svendsen also discloses a system for compensating for transient overshoot and undershoot in the movement of a member in a position feedback system. U.S. Pat. No. 4,122,503 to Allan also discloses a positioning system used with floppy disks and which uses offset measurement and compensates for position error.

Accordingly, it is an object of the present invention to provide a new and improved digital positioning control system in which a moveable member can be moved to a command position at a relatively high speed with compensation for position error and velocity error in response to a position command signal.

It is another object of the present invention to provide a digital positioning system which utilizes a velocity profile for comparing a velocity command to a determined velocity.

It is a further object of the present invention to provide a digital positioning control system which is capable of generating highly accurate digital position and velocity control signals in response to the output signals from an incremental position optical encoder.

It is still another object of the present invention to provide a method of positioning a moveable member from an initial starting position to a command position by causing movement of the moveable member to a maximum velocity with movement at the maximum velocity until a position in advance of the command position at which point deceleration and concomitant velocity decrease are achieved until the moveable member reaches the command position.

With the above and other objects in view, my invention resides in the novel features of form, construction, arrangement and combination of components and parts presently described and pointed out.

BRIEF SUMMARY OF THE DISCLOSURE

The foregoing and other objects of the invention are accomplished by a digital positioning system which employs an incremental position optical encoder also used as a position transducer. The moveable member may adopt the form of one or more reading heads or reading/writing heads of a magnetic disk drive, or it may adopt the form or a magnetic member, such as a disk or similar moveable member, in computer disk systems. The position control system is effective in a variety of systems for precisely moving a moveable member to a command position. In the case of a computer system using reading heads, these heads may be moved along a linear track by means of an actuator such as an electrically operated voice-coil type actuator. This actuator would normally be driven to cause movement of a reading head to a particular portion of a disk in response to a digital position command signal and the position of the head would be detected by means of an encoder, as for example, an optical shaft encoder.

The encoder, or other form of position detecting means, is designed to provide an analog position signal which may be converted to a digital position signal P by a conventional analog-to-digital converter. The digital servo system uses the position signal as part of the closed-loop control system to accurately position the moveable member.

The position signal may be provided as an input to a digital subtractor along with a digital position command signal PC. In this case, the position signal itself may be the signal which is the initial position or otherwise, a position during movement of the moveable member. Further, the digital position command signal preferably exists in the form of a binary number and represents the desired position to which the member, such as the head or heads are to be moved.

The digital subtractor will subtract the measured position signal from an actual command position signal in order to provide an output differential position error signal PE which represents the error between the command position (identified by the position command signal PC) and the actual position P of the moveable member. This signal is also provided as an input signal to a storage register under the control of a digital clock and thereby stores the previous value of the position, i.e. the previous position P'.

The time interval between a previous value P' of the position signal and the present position P is an interval which is a differential of time, under the control of a clocking member, such as a clock pulse generator. The previous position P' is then subtracted from the present position P by another digital subtractor to provide an output signal DP which represents a change in position of the moveable member over this time interval. The differential time signal from the clock pulse generator and the differential position signal from this subtractor are both provided as input signals to a digital divider.

The digital divider divides the differential position signal DP by the differential time signal DT to provide an output velocity signal V which represents the measured velocity of the moveable member in the form of a binary number. This velocity V is then compared to a predetermined velocity profile VC stored in a velocity profile storage register. A particular velocity profile may be provided to maximize the speed at which the moveable member moves to the desired command position while at the same time, avoiding any overshoot or undershoot of the command position itself.

A digital subtractor is used to subtract the measured or desired velocity signal V from the velocity command signal VC itself in order to provide an output velocity error signal VE.

A digital adder is used to sum the position error signal and the velocity error signal in order to provide a total output error signal E which represents a composite for both velocity and position errors. This total error signal, which again, is in digital form, is converted to an analog signal by digital to an analog converter. This latter output signal from the converter is provided as an input signal to a power amplifier used to control the actuator and thereby complete the loop of the digital servo system.

By storing the velocity profile which is a function of the position error, the servo system of the present invention can provide optimum control for the motion of the heads or other moveable member while avoiding overshoot or undershoot. For example, the velocity profile can be configured to maximize head velocity for large position errors and as the head position approaches the desired position the velocity is decreased along a predetermined curve to decelerate the head motion as it approaches the command position.

These and other objects, features and advantages of the invention will become apparent from the reading of the specification when taken in conjunction with the drawings in which like reference numerals refer to like elements in the several figures. This invention also possesses many other advantages and has other purposes which will be made more clearly apparent from a consideration of the forms in which it may be embodied as shown in these accompanying drawings. They will now be described in detail for purposes of illustrating the general principals of the invention, but it is to be understood that such detailed descriptions are not to be taken in a limiting sense.

BRIEF DESCRIPTION OF THE DRAWINGS

Figure 5:
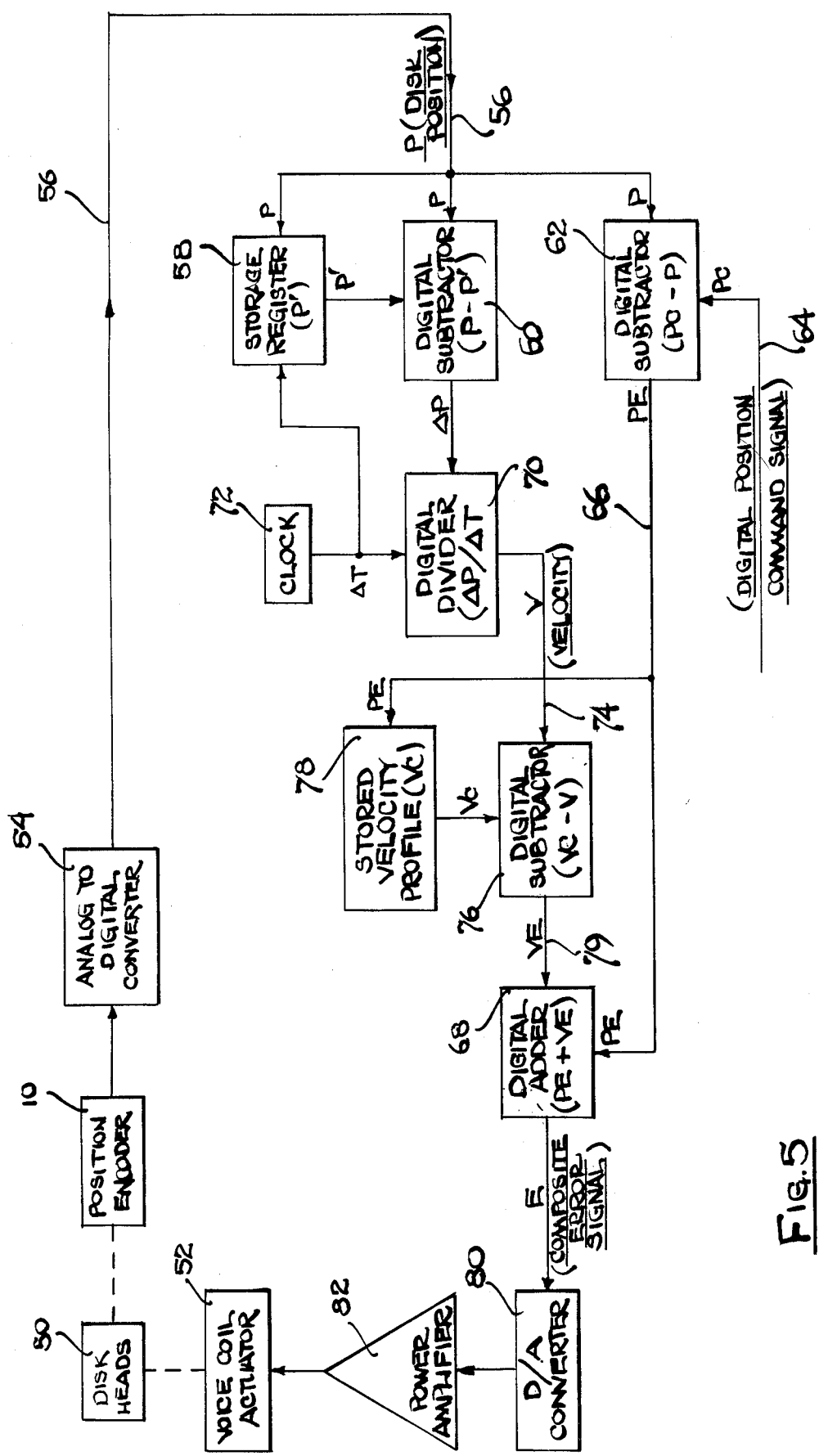

Having thus described the invention in general terms, reference will now be made to the accompanying drawings in which:

FIG. 1 is a schematic illustration showing an incremental position optical shaft encoder used in a digital positioning system forming part of the present invention along with initial output wave forms generated therein;

FIG. 2 is a graphical illustration showing the relation of in-phase and quadrature signals generated by the optical shaft encoder;

FIG. 3 is a graphical illustration showing a profile of distance as a function of acceleration for a moveable member which is moved in the digital positioning system of the present invention;

FIG. 4 is a graphical illustration showing a velocity profile in which velocity is a function of distance for moving a moveable member in accordance with the digital positioning system of the present invention;

FIG. 5 is a block diagram showing the major components of the digital positioning system of the present invention;

FIG. 6 is a graphical illustration showing a velocity profile curve; and

FIG. 7 is a flow chart showing the program or operation of a preferred embodiment of the system of the present invention.

DETAILED DESCRIPTION OF A PREFERRED EMBODIMENT

Referring now in more detail and by reference characters to the drawings which illustrate a preferred embodiment of the present invention, FIG. 1 illustrates a position encoder, such as an optical encoder mechanism 10 and associated components which form part of the digital positioning system of the present invention. This optical encoder mechanism 10 is only one form of position encoder mechanism which may be employed in the closedloop digital servo system of the invention for generating position signals, as hereinafter described in more detail.

The optical shaft encoder mechanism 10 is operable with and includes a light source 12, which may be in the form of one or more light-emitting diodes, and which are illuminated by a power supply 14. One or more photo transducers, such as a pair of socalled "photo sensors" 16 and 18, are located to receive light from the light source 12. Mounted between the light source 12 and the photo sensors 16 and 18 is a moveable disk 20 and a fixed reticle 22. The fixed reticle 22 is mounted to a frame 24 which forms part of the encoder mechanism 10 and which frame 24 also is adapted to support the photo sensors 16 and 18. The frame 24 is shown in the form of a flat plate, although it should be understood that any conventional frame means could be employed and which may, for this purpose, also mount the power supply 14 and the light source 12.

The moveable disk 20 is axially mounted to one end of an output shaft 26 of a drive member, in the form of a drive motor 28. Preferably this motor 28 is, although not necessarily, a servo motor. Several types of conventionally available servo motors are well known in the industry. The positionable or moveable member which is often referred to as a "load" is mounted to the opposite end of the motor drive shaft 26 and is designated by reference numeral 30, in the manner as illustrated in FIG. 1 of the drawings.

The motor 28 is driven by a motor drive signal appearing on an input motor drive line 32 and in response to the operation of the servo control system used to position the load or moveable member 30, as hereinafter described in more detail.

The moveable disk 20, and for that matter, the fixed reticle 24 may each be constructed of thin sheets of a transparent material, such as glass. The surfaces of both the disk 20 and the reticle 22 are provided with patterns of equally spaced apart clear and opaque segments which may be formed by photographic imprinting. The clear segments are in the form of narrow spaces angularly disposed and equally spaced around the periphery. Further, the disk 20 and the reticle 22 are positioned in parallel spaced-apart relationship with typically, ten mills of clearance between them.

As shown in FIG. 1, the output signals from the photo sensors 16 and 18, which are typically in the form of photo diodes, as aforesaid, are amplified, respectively, by amplifiers 38 and 40, resulting in in-phase and quadrature signals shown by wave forms I and Q, appearing on lines 42 and 44, respectively. The wave form I is in the shape of a sine wave with one full cycle of the sine wave being generated in response to each fringe created by the movement of the disk 20. Similarly, the waveform Q is in the form of a cosine wave with one full cycle of the cosine wave being generated in response to each fringe.

A variety of incremental position optical shaft encoders of the type described above are commercially available, such as encoder type R-1500, manufactured by Electro-Craft Corporation, Hopkins, Minn., and encoder type L-25, manufactured by BEI Electronics, Inc., Little Rock, Ark. One technique for using these types of encoders to determine position is by counting the number of fringes operated as the disk 20 rotates. Fringe counting is accomplished by detecting each zero crossing occurrence of the waveforms I and Q. Another technique for using incremental position encoders to determine position is by measuring the relative slopes of the waveforms I and Q. The accuracy of a position determination is a function both of the relative amplitudes of the waveforms I and Q, and of the relationship of the waveforms I and Q to a zero baseline.

FIG. 2 is a graphic illustration of the waveforms of the in-phase signal I and the quadrature signal Q from the encoder mechanism 10, both plotted on a common horizontal axis representing the position of the moveable disk 20. The waveforms shown in FIG. 2 represent the output signals I and Q produced when the disk 20 moves from a zero position corresponding to the beginning of a fringe, to a position corresponding to the end of a single fringe. The waveforms I and Q are seen to represent sine and cosine waves, respectively, which are separated in phase by ninety degrees.

Under ideal conditions the signals I and Q are perfectly symmetrical about a zero baseline as represented by the waveforms shown in FIG. 2. However, due to manufacturing tolerances in the construction of incremental encoders, the signals I and Q include errors in both offset and amplitude. The waveforms I and Q as shown include a position error which shifts the symmetry of the waveforms I and Q with respect to the zero baseline.

Energizing the motor 28 causes the moveable disk 20 to rotate with respect to the reticle 22. The relative orientation of the apertures 46 of the disk 20 and the reticle 22 produce light paths from the light source 12 to the photo sensors 16 and 18 in the form of Moire fringes which occur in a periodic pattern in response to the rotation of the disk 20. These fringes are detected by the photo sensors 16 and 18 in response to the light rays emitted from the light source 12 and which pass through selected apertures 46 in the disk 20 and the reticle 22 in response to the angular position of the moveable disk 20 and, hence, the position of the member 30. Rotation of the moveable disk 20 by an amount equal to the distance between adjacent apertures 46 creates a single fringe. In a manner well known to those skilled in the art, for constant speed rotation of the motor shaft 28, the fringes are created in sucession corresponding to the equal spacing of the apertures 46 around the periphery of the disk 20. The photo sensors 16 and 18 are positioned with respect to the reticle 22 so that the light received by these sensors produces an in-phase signal at the output line 42 of the photo sensor 16 and produces a quadrature signal at the output line 44 of the photo sensor 18.

FIG. 3 is a graphical illustration showing an optimum acceleration curve for moving a moveable member, such as a disk reading head from an initial or start position PI (at zero velocity) to a command position PC. In this case, it can be observed that under the most ideal conditions, acceleration would occur from the initial position to a maximum acceleration and thereafter a deceleration to the command position PC. Under the most ideal conditions, the maximum acceleration would occur at a point midway between the initial position PI and the command position PC. In actuality, there is a finite acceleration which may exist and this would necessarily result in other than a linear acceleration and other than a linear deceleration, as shown in FIG. 3.

FIG. 4 more fully illustrates an optimum velocity profile of the movement of a moveable member from an initial position PI to a command position PC. Here again, velocity increase from a zero velocity would be linear until maximum velocity has been achieved as shown in FIG. 4. Thereafter, movement of this moveable member would continue at the maximum velocity on a generally linear plane until a selected point in advance of the command position is reached. Thereafter, the velocity would be decreased, generally at the same rate as the velocity increase from the initial position to maximum velocity.

Each of the aforementioned acceleration and velocity profiles represent ideal conditions. In actuality, the acceleration and the velocity are not ideal as such. The present invention provides a system which attempts to account for the fact that the velocity and acceleration profiles are non-ideal and also accounts for the non-linearities which may exist. The present invention therefore operates on a stored velocity profile for movement of the moveable member from an initial position to a command position and also accounts for the actual position of the moveable member with respect to a measured position of this moveable member.

Referring now to FIG. 5, it can be observed that the moveable member, in schematic format, may be one or more disk heads for use in a computer having magnetically recorded storage disks and which moveable members, such as the disks or heads is represented by reference numeral 50. Movement of these disk heads is accomplished by actuation of a pneumatic transducer, as for example, a voice coil actuator 52.

A position encoder as for example, the position encoder 10 is connected to the disk heads or other moveable member, and more specifically, in one preferred embodiment, to the output shaft 26 in order to generate signals representative of the actual position of the moveable member, e.g. the disk head. This position encoder 10 generates an analog signal representative of the position of the disk heads and this signal is converted to a digital format by means of an analog-to-digital convertor 54 which is connected to the output of the position encoder 10. The analog-to-digital convertor 54 effectively converts the position of the moveable member into a digital number for further processing as hereinafter described in more detail.

The output of the analog to digital converter 54 represents an acutal disk position, which, in this case, may represent a previous disk position P' when stored and is carried on an output line 56 from the converter 54. This actual disk position P is stored in a position storage register 58 and when stored, will represent a previous position P' as aforesaid. The actual position P of the disk which may be the next measured position is introduced from the analog to digital converter 54 into a digital subtractor 60 which is effective to subtract the value of the previous position P' from the present or measured position P in the manner as shown in FIG. 5 of the drawings. The output of the digital subtractor 60 is a differential position signal represented by the symbol "DP".

The digital position signal representative of the then measured position P is also simultaneously introduced into another digital subtracter 62 which is also capable of receiving a digital position command signal over a position command line 64. The digital command position is designated by reference letters "PC". The command signal PC is that signal which is generated in response to a requirement for positioning a disk or reading head at a certain position, e.g. the command position. The digital subtractor 62 is also effective for subtracting the actual position P from the command position PC. The output of the digital subtractor 62 represents a position error signal PE carried on a position error line 66 and which is introduced into a digital adder 68, in a manner hereinafter described and for reasons which will presently more fully appear. It can be observed that the position error signal PE, when subtracted from the actual command position, is actually representative of that actual position error existing between the command position and the actual position of the moveable member.

The differential position signal DP is divided by a differential time DT in a digital divider 70 which receives the differential position signal DP from the digital subtractor 60. The digital divider also receives a differential time clocking signal DT from a clock member, such as a clocking oscillator 72 and which also has an output introduced into the storage register 58. In this way, the position such as the position differential derived from the subtractor 60 can be properly divided by a time interval, such as the time interval in the digital divider 70 on a clocktime basis.

It can be seen that the position divided by the time in the digital divider 70 is actually representative of a velocity signal which is carried on a velocity line 74 and introduced into a velocity digital subtracter 76. The digital subtracter 76 also receives a stored velocity signal from a stored velocity profile in a velocity profile register 78. This velocity profile is actually representative of a velocity command signal. The digital positioning signal is one in which position of the moveable member is selected and commanded. While the velocity per se is not commanded as such, a stored velocity does represent an effectual command of velocity of the moveable member during a certain point in time and relative to its position error. Thus, the stored velocity position signal which represents a velocity command signal is represented by reference letters "VC". In this respect, it can also be observed that the velocity profile register 78 also receives a position error input signal.

The velocity command signal VC is also introduced into the digital subtracter 76 as aforesaid and the velocity measurement V thus made and determined by the digital divider 70 is subtracted from the velocity command. This provides a velocity error signal designated by reference letters "VE" and introduced over a velocity error line 79 to the digital adder 68.

At this point in time, an actual velocity error signal and an actual position error signal have been derived. The sum of the signals which is provided by the adder 68 represents a composite error signal E and this composite error signal is introduced into a digital analog converter 80.

The error signal is converted into an analog format for purposes of operating a power amplifier 82 which, in turn, drives the voice coil actuator 52 in the manner as illustrated in FIG. 5.

As indicated above, various factors such as vacuum conditions, friction and the like render the servo motor or other drive motor and for that matter, other mechanically moveable components to be non-linear. The present invention compensates for both velocity and positional errors. Compensation would be exceedingly difficult in an analog system and thus, computation and compensation for these errors is provided in the digital format as heretofor described. The present invention is effective to digitally compute a velocity and position profile curve for the motor and effectively match this to the operation of the motor. This velocity curve is produced and stored as the velocity demand signal and is a function of distance. The linear deceleration and acceleration is proportional to the square root of the distance. However, as indicated above, even the acceleration and deceleration profile is not accurate since the motor itself is not perfect.

In accordance with the present invention, a deceleration profile is defined by a velocity profile at a selected distance. From the velocity profile it is possible to slow the motor down or cause a motor to operate faster at a selected point in time.

A typical velocity demand curve, which is effectively the velocity profile, is more fully illustrated in FIG. 6 of the drawings. In this case, the velocity demand curve is a function of the velocity demand over a selected distance. In effect, the velocity demand curve is derived as a series of incremental steps as also shown in FIG. 6. However, the number of steps used to generate the velocity demand curve are large so that linear interpolation may be made. It is this linear interpolation which is the velocity demand curve and hence the velocity command signal.

As will be understood by those skilled in the art, the various digital processing functions shown in FIG. 5 may be implemented in any of a number of different ways. However, the preferred embodiment of the invention utilizes an integrated circuit microprocessor. Such integrated circuit microprocessors are well known and include all the input, output, memory, logic and control circuitry of a special purpose digital computer in miniature form. In general, such circuits have both random access memory (RAM memory) and read only memory (ROM memory). The ROM memory has connections formed by masking operations during the construction of the basic circuitry to provide a completely wired circuit which includes the program for controlling the operation of the microprocessor to perform the functions shown in FIG. 5. Such an arrangement is often described as a dedicated memory circuit. The RAM memory of the circuit is utilized for storage of the various transient bits of information and the program during the operation of the circuitry.

The method of operation has also been described in connection with the previous description of the system itself. However, some of the major method steps in their sequence of operation are set forth in FIG. 7 of the drawings. In this case, the initial position of the moveable member such as the reading member or the disk is shown at step 100 and this initial position, as measured, is the signal transmitted from the analog-to-digital converter 54 over the line 56. This initial position P actually becomes a previous position P' when another position measurement is made and this previous position signal P' is then stored as shown in step 102. Thereafter, the stored position P' is subtracted from the actual or subsequent measured position P to obtain the differential position signal DP in step 104. The velocity is computed at step 106 by dividing the differential position DP by a differential time signal DT derived from the clocking oscillator 72. The position error signal PE is determined at step 108 by subtracting the actual position signal from a position command signal PC in order to derive the position error signal PE.

The velocity error signal VE is derived by subtracting the actual velocity V from a velocity command signal VC, the latter being derived from the stored velocity profile storage member 78. The velocity itself was calculated in step 106 and the computation of the velocity error signal VE is shown in step 110. Thereafter, it is possible to compute the total error signal E in step 112 by adding the position error to the velocity error signal. The error signal E is then converted to an analog signal in step 114 and is effectively accomplished by the digital-analog converter 80. The output of the converter is thereupon used to power the amplifier and motor for operation of the moveable member.

Thus there has been illustrated and described a unique and novel digital positioning servo operated control system which accounts for velocity and position error conditions to move a member to a command position on a highly efficient basis. This apparatus therefore fulfills all of the objects and advantages sought therefore. It should be understood that many changes, modifications, variations and other uses and applications will become apparent to those skilled in the art after considering this specification and the accompanying drawings. Therefore, any and all such changes, modifications, variations and other uses and applictions which may become apparent to those skilled in the art after considering this specification and the accompanying drawings are deemed to be covered by the invention which is limited only by the following claims.

Having thus described my invention, what I derive to claim and secure by Letters Patent is:

1. In a closed loop digital control system having a moveable member adapted for movement to a command position in response to a command position signal, an encoding means for providing position information and a motive means for moving the moveable member, an improvement comprising:
   (a) position detecting means for detecting and subtracting a previous position from a present position and generating a position differential signal effectively on a generally continuous basis relative to controlling the operation of said motive means and storing the position differential signal,
   (b) a digital divider and a clocking means operable to derive a present velocity from the position of the moveable member on a clock time basis,
   (c) velocity detecting means for subtracting the determined present velocity from a stored predetermined velocity which represents a desired velocity to generate a velocity differential signal effectively on a generally continuous basis relative to controlling the operation of said motive means and storing the velocity differential signal, and
   (d) means for combining the velocity and position differential signals to provide a combined differential signal and applying said combined signal to said motive means to control operation thereof for moving the moveable member to the command position in response to the command position signal.

2. The improvement in the control system of claim 1 further characterized in that the desired velocity condition is derived from a stored velocity profile of the moveable member.

3. The improvement in the control system of claim 1 further characterized in that the desired velocity is stored as part of a velocity profile of the moveable member in a velocity profile storage.

4. The improvement in the control system of claim 1 further characterized in that said present velocity condition is derived by dividing the differential distance of present position to the previous position by a selected clocking time.

5. The improvement in the control system of claim 1 further characterized in that said combined differential signal is a digital signal which is converted to an analog signal for driving said motive means.

6. The improvement in the control system of claim 1 further characterized in that said moveable member is a magnetic indicia reading member which is moveable relative to a disk in a computer system for reading or writing information with respect to said disk.

7. The improvement in the control system of claim 1 further characterized in that said improvement enables movement of said moveable member from said previous position to said command position to attempt to achieve an acceleration profile in which said moveable member accelerates from the previous position to a point approximately midway between the previous position and command position and thereafter decelerates to the command position.

8. The improvement in the control system of claim 1 further characterized in that said improvement enables movement of said moveable member from said previous position to said command position to attempt to achieve a velocity profile in which said moveable member moves to maximum velocity and moves at maximum velocity to a point in advance of said command position equal to the distance from said previous position to position of maximum velocity, and at which point in advance of the command position the velocity decreases at the same rate of speed from previous velocity to maximum velocity.

9. The improvement in the control system of claim 1 further characterized in that position differential signals are generated at a rate significantly greater than the rate of operation of the motive means so that said motive means effectively responds to an effective average of position differential signals.

10. The improvement in the control system of claim 9 further characterized in that velocity differential signals are generated at a rate significantly greater than the rate of operation of the motive means so that said motive means effectively responds to an effective average of velocity differential signals.

11. The improvement in the control system of claim 1 further characterized in that said improvement comprises storage means containing a stored velocity profile for providing a predetermined velocity relative to a position of the moveable member and which velocity profile may be non-linear.

12. A closed loop digital position control system for accurately positioning a dynamically moveable member in response to a command signal, said system comprising:
 (a) moving means for moving the dynamically moveable member to a command position in response to a digital command signal,
 (b) encoding means for detecting the position of said member at a selected point in time,
 (c) position error detecting means for providing a position error signal based on the position of the member at the selected point in time and with respect to a desired position represented by said command signal,
 (d) velocity error detecting means for providing a velocity error signal relative to a stored velocity and on a clock time basis,
 (e) means for relating the velocity error signal to the position error signal to provide a total error signal, and
 (f) means for adjusting the moving means in response to the total error signal to thereby correct for the total error signal and thereby move the moveable member to the command position at a more optimum velocity profile.

13. The closed loop digital position control system of claim 11 further characterized in that said system comprises storage means for storing a velocity profile of said moveable member from a previous position to at least said command position and where the demand position is represented by said command signal.

14. The improvement in the control system of claim 12 further further characterized in that said velocity error signal is determined relative to a stored velocity on a clock time basis and which clock time basis is provided by a synchronous clocking means.

15. The improvement in the control system of claim 11 further characterized in that the means for relating adds the velocity error signal to the position error signal.

16. The improvement in the control system of claim 12 further characterized in that said system enables movement of said moveable member from said position at said selected point in time to said command position as represented by the command signal, to attempt to achieve an acceleration profile in which said moveable member acelerates from the position at the selected point intime to a point approximately midway between the position at the selected point in time and command position and thereafter deceleration to the command position.

17. The improvement in the control system of claim 12 further characterized in that said system enables movement of said moveable member from said position at the selected point in time to said command position as represented by said command signal, to attempt to a achive a velocity profile in which said moveable member moves to maximum velocity and moves at maximum velocity to a point in advance of said command position equal to the distance from said position at the selected point in time to position of maximum velocity, and at which point in advance of the command position the velocity decreases at the same rate of speed from previous velocity to the maximum velocity.

18. A closed loop digital position control system for shifting a moveable member with compensation for velocity error, said system comprising:
 (a) storage means for storing a velocity profile of movement of a dynamically moveable member,
 (b) means for generating a command signal for moving the dynamically moveable member to a command position,
 (c) means for generating a digital equivalent signal representative of said command signal, (d) comparison means for comparing the velocity profile against the digital equivalent signal and thereby comparing the position of the member against the velocity profile to provide a velocity error signal between the actual position with respect to the command position, and (e) synchronous clocking means for providing a clock time basis so that said velocity error signal is generated relative to a stored velocity on a clock time basis, (f) means for compensating for the velocity error between the actual and command positions to adjust the velocity so that the moveable member reaches the command position in the time interval consistent with the stored velocity profile.

19. The improvement in the control system of claim 18 further characterized in that said system comprises position error detecting means for detecting a position error and which compensates for the position error.

20. The improvement in the control system of claim 19 further characterized in that a velocity condition of the moveable member is derived by dividing a position differential by a selected clocking time.

21. In a method of accurately positioning a dynamically moveable member in response to a command signal in a closed loop digital position control system, said method comprising:

(a) generating a command signal for moving a dynamically moveable member to a command position in response thereto, (b) detecting the position of said dynamically moveable member at a selected point in time, (c) deriving a position error signal based on the position of the member at the selected point in time and with respect to a desired position represented by said command signal, (d) determining a velocity error signal relative to a stored velocity on a clock time basis, (e) relating the velocity error signal to the position error signal to provide a total error signal, and (f) adjusting the movement of the moveable member in response to the total error signal to thereby correct for the total error signal and thereby move the moveable member to the command position at a more optimum velocity profile.

22. The improvement in the method of claim 21 further characterized in that said method comprises determining the velocity error signal relative to a stored velocity on a clock time basis and providing said clock time basis by a synchronous clocking means.

23. The improvement in the method of claim 21 further characterized in that the step of relating the velocity error signal to the position error signal comprises adding the velocity error signal to the position error signal.

24. In a closed loop digital control system having a moveable member adapted for movement to a command position in response to a command position signal, an encoding means for providing position information, and a motive means for moving the moveable member, an improvement comprising:

(a) position detecting means for detecting and subtracting a previous position from a present position and generating a position differential signal and storing the position differential signal, (b) storage means containing a stored velocity profile for providing a predetermined velocity relative to a position of the moveable member and which velocity profile may be non-linear, (c) a digital divider and a clocking means operable to derive a present velocity from the position of the moveable member on a clock time basis, (d) velocity detecting means for subtracting the determined present velocity from a stored predetermined velocity from said storage means which represents a desired velocity to generate a velocity differential signal and storing the velocity differential signal, and (e) means for combining the velocity and position differential signals to provide a combined differential signal and applying said combined signal to said motive means to control operation thereof for moving the moveable member to the command position in response to the command position signal.

25. The improvement in the control system of claim 24 further characterized in that said position detecting means comprises means for subtracting a previous position with respect to a present position and storing the position differential therefrom, and said velocity detecting means comprises means for subtracting a present velocity condition from a desired velocity condition and storing the velocity differential therefrom, and which differential signals are combined to provide a combined differential signal.

26. The improvement in the control system of claim 25 further characterized in that said improvement comprises a digital divider and a clocking means so that said present velocity condition is derived from the position of said moveable member on a clock time basis.

27. The improvement in the control system of claim 24 further characterized in that said present velocity condition is derived by dividing the differential distance of present position to the previous position by a selected clocking time.

28. The improvement in the control system of claim 24 further characterized in that said combined differential signal is a digital signal which is converted to an analog signal for driving said motive means.

29. The improvement in the control system of claim 24 further characterized in that said improvement enables movement of said moveable member from said previous position to said command position to attempt to achieve an acceleration profile in which said moveable member accelerates from the previous position to a point approximately midway between the previous position and command position and thereafter decelerates to the command position.

30. The improvement in the control system of claim 24 further characterized in that said improvement enables movement of said moveable member from said previous position to said command position to attempt to achieve a velocity profile in which said moveable member moves to maximum velocity and moves at maximum velocity to a point in advance of said command position equal to the distance from said previous position to position of maximum velocity, and at which point in advance of the command position the velocity decreases at the same rate of speed from previous velocity to maximum velocity.

* * * * *